United States Patent [19]

Casey

[11] 4,389,769

[45] Jun. 28, 1983

[54] TERMINATING TOOL WHICH IS ADJUSTABLE TO ACCOMMODATE DIFFERENT CENTERLINE SPACING

[75] Inventor: Daniel T. Casey, Harrisburg, Pa.

[73] Assignee: AMP Incorporated, Harrisburg, Pa.

[21] Appl. No.: 246,989

[22] Filed: Mar. 24, 1981

[51] Int. Cl.$^3$ .............................................. B23P 19/02

[52] U.S. Cl. .............................................. 29/751; 29/753; 29/759

[58] Field of Search .............................................. 29/750–754, 29/759, 566.3, 566.4

[56] References Cited

U.S. PATENT DOCUMENTS 3,039,337 6/1962 Stuart-Prince .......................... 81/15
3,742,571 7/1973 Brehm .............................. 29/203 H
4,243,288 1/1981 Lucius et al. ...................... 339/99 R
4,286,381 9/1981 Litehizer, Jr. ........................ 29/751

*Primary Examiner*—Carl E. Hall
*Assistant Examiner*—P. W. Echols
*Attorney, Agent, or Firm*—Russell J. Egan

[57] ABSTRACT

A hand tool is disclosed for sequentially terminating individual wires into terminals by utilizing an insulation displacing technique. More particularly, the subject tool includes an indexing system which can be adjusted to accommodate connectors having terminals on different centerline spacings and still accomplish accurate positioning of the conductor with respect to the associated terminal. The subject tool can also accommodate connectors having preloaded terminals on one or both sides of the connector.

10 Claims, 7 Drawing Figures

Fig. 4
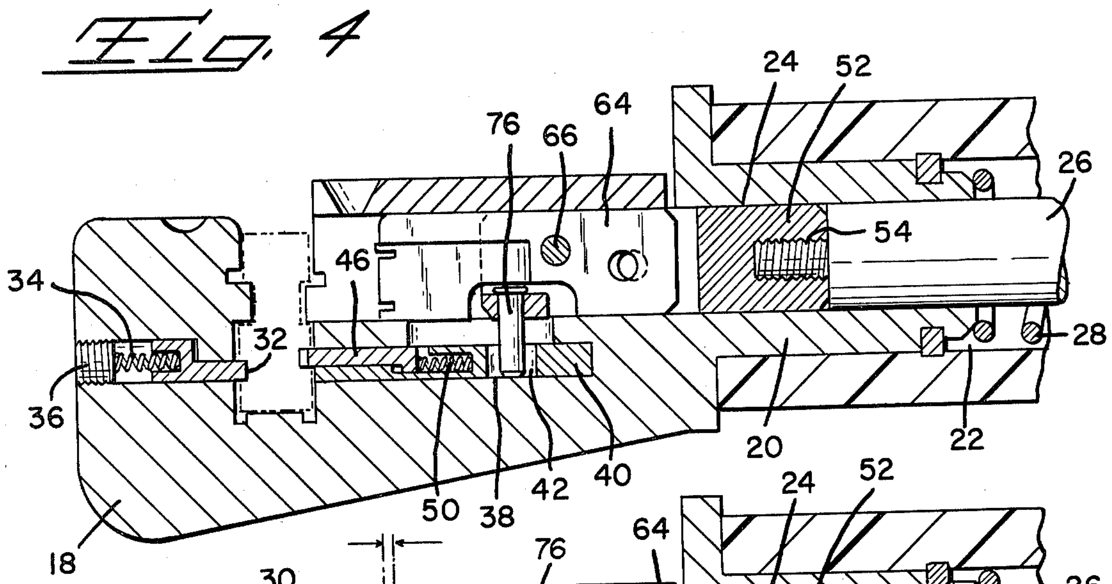
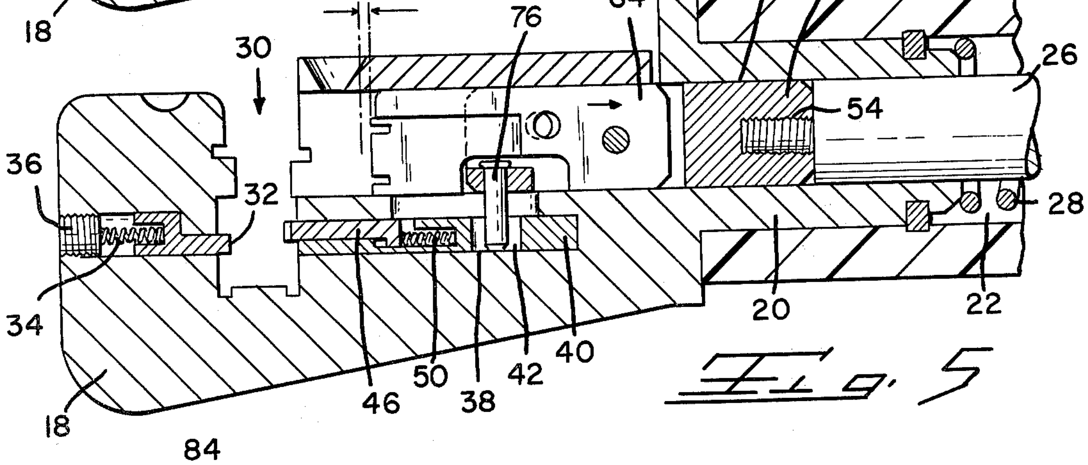
Fig. 5
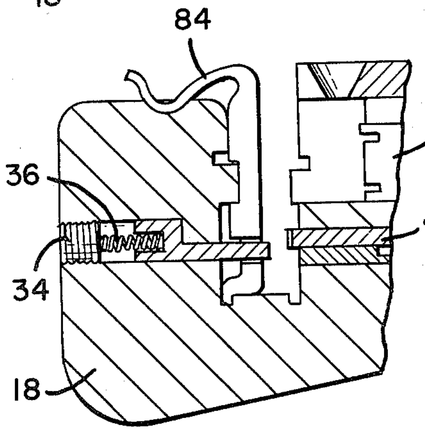
Fig. 7
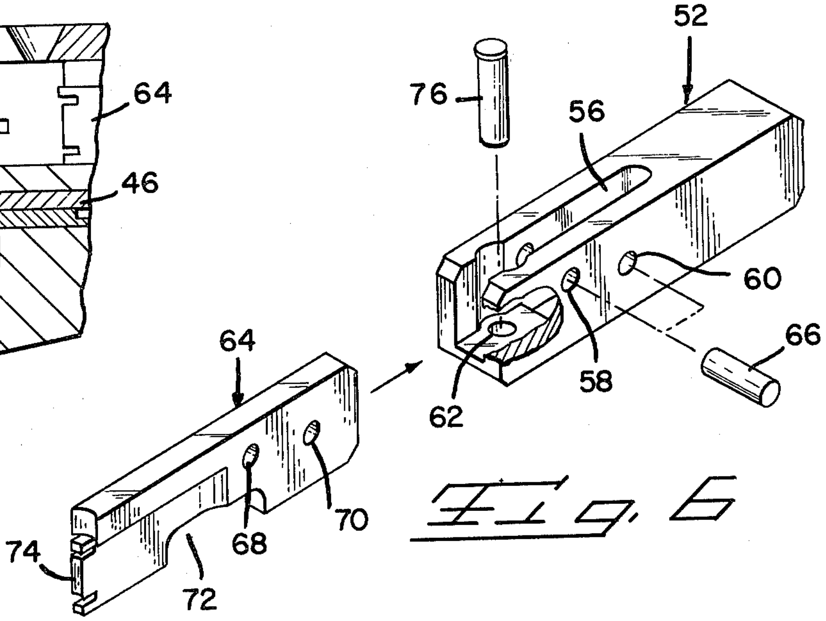
Fig. 6

TERMINATING TOOL WHICH IS ADJUSTABLE TO ACCOMMODATE DIFFERENT CENTERLINE SPACING

BACKGROUND OF THE INVENTION

1. Field of the Invention

The present invention relates to a hand tool of the type utilized in effecting termination of individual conductors in electrical terminals which are preloaded in a connector and in particular to a tool which can be adjusted to accommodate connectors having terminals on different centerline spacings.

2. The Prior Art

The present invention relates to an improved version of the tool disclosed in U.S. patent application Ser. No. 106,306 filed Dec. 21, 1979 now U.S. Pat. No. 4,286,381, the disclosure of which is incorporated herein by reference. A somewhat similar tool, which also includes a wire trimming feature, is disclosed in U.S. Pat. No. 3,742,571.

SUMMARY OF THE INVENTION

The present invention is a hand tool having a work frame upon which is located an indexing means and wire stuffing means, both actuated by a trigger gripping mechanism. The connector terminated by the subject tool is of the type having a series of partially open passages, each containing a terminal having an insulation displacing portion accessible in an open portion of the respective passage. As the connector is sequenced through the subject tool, a wire is driven into the exposed portion of the respective terminal and the connector indexed to present the next sequential terminal to the wire stuffing means. The subject invention includes means for readily altering the indexing drive instance so that connectors having different terminal centerline spacings can be accommodated with facility. Also, the subject tool is adaptable for handling both single sided and double sided connectors.

It is therefore an object of the present invention to produce an improved terminating tool for applying individual conductors sequentially to insulation displacing terminals preloaded into and partially exposed from an electrical connector.

It is another object of the present invention to produce an improved terminating tool which can be readily adjusted to accommodate electrical connectors having terminals disposed therein with different centerline spacings.

It is another object of the present invention to produce a terminating tool which can be used with both single sided and double sided electrical connectors.

It is a further object of the present invention to produce a terminating tool which can be readily and economically manufactured.

The means for accomplishing the foregoing objects and other advantages will become apparent to those skilled in the art from the following detailed description taken with reference to the accompanying drawings.

BRIEF DESCRIPTION OF THE DRAWINGS

FIG. 4 is a vertical longitudinal section taken along line 4—4 of FIG. 1 showing the subject tool adjusted for a first centerline spacing;

FIG. 5 is a vertical longitudinal section similar to FIG. 4 showing the subject tool adjusted to accommodate a second centerline spacing;

FIG. 6 is an exploded perspective view of the portions of the subject tool which accomplish the adjustability feature; and FIG. 7 is a vertical longitudinal section, similar to FIGS. 4 and 5, showing an insert allowing the subject tool to accommodate connectors having terminals in a single row.

DETAILED DESCRIPTION OF THE PREFERRED EMBODIMENT

Figure 1:
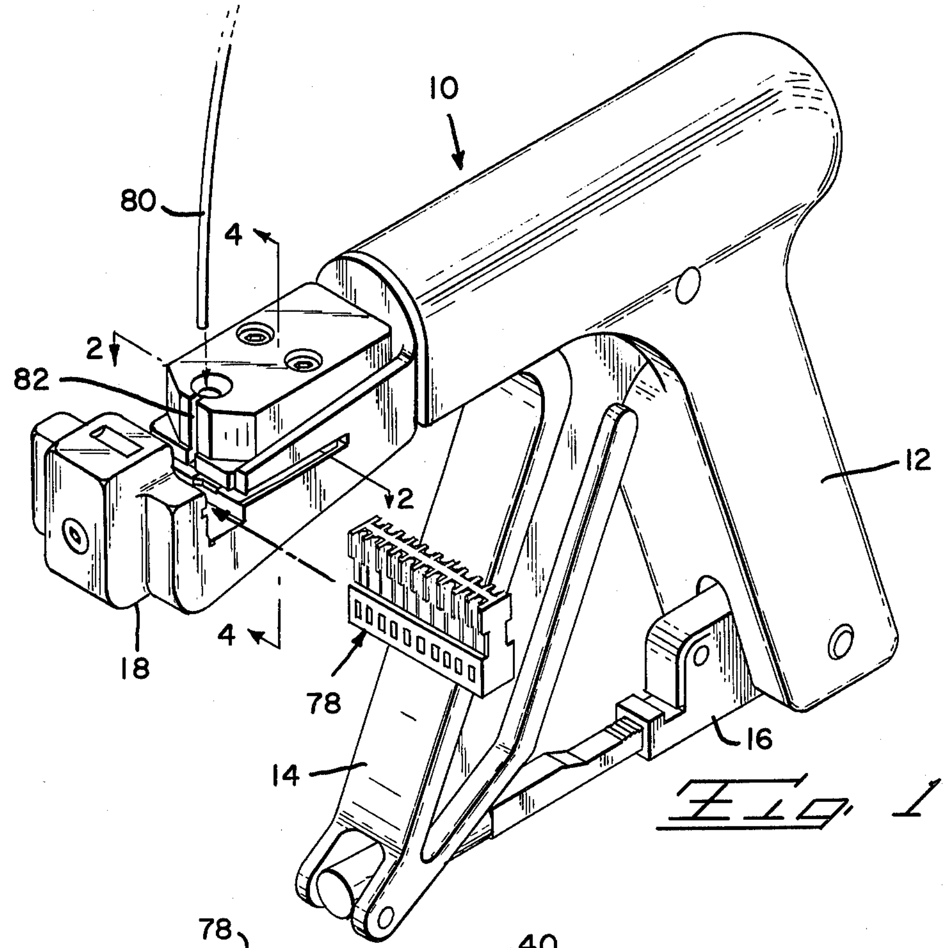
FIG. 1 is a perspective view of the subject tool with a connector and conductor exploded therefrom.

The subject terminating tool 10 includes a hand grip 12 with an actuating lever 14 and ratchet mechanism 16 mounted therein. The ratchet mechanism 16 can be of the type disclosed in U.S. Pat. No. 3,039,337, the disclosure of which is incorporated herein by reference. The tool 10 also includes an insertion head 18 which has a cylindrical portion 20 received in a bore 22 of the hand grip 12. The cylindrical portion 20 has an axial bore 24 which receives an actuation rod or ram 26 in known fashion. The rod 26 is spring biased by compression spring 28 and driven by lever 14 in the manner disclosed by U.S. Pat. No. 3,742,571, the disclosure of which is incorporated herein by reference.

The insertion head 18 has a transverse connector guide groove 30, as best seen in FIGS. 4 and 5, which is profiled to receive therein an electrical connector similar to the type disclosed in U.S. Pat. No. 4,243,288, the disclosure of which is incorporated herein by reference. Opening into one side of the groove 30 there is a spring loaded ratchet stop including a pawl 32, a spring 34, and a threaded plug 36. On the opposite wall of the groove 30 there is a horizontal slot 38 having therein a profiled plate 40 (see FIGS. 2 and 3) having a driving slot 42 therein. The forward part of the plate 40 has a recess 44 containing therein a driving pawl having a connector engaging tooth 48 and being spring loaded by a compression spring 50.

The conductor insertion mechanism has a driving yoke member 52 (see FIGS. 4 to 6) with an axial threaded bore 54 which receives an end portion of the actuation rod 26. The yoke member 52 also contains an elongated slot 56 (see FIG. 6) intersected by a first pair of horizontal bores 58 and a second set of horizontal bores 60 and a vertical bore 62 in the base of the slot. A profiled insertion member 64 is received in the slot 56 and joined to the yoke member 52 by means of a removable pin 66 passing through either set of bores 58, 60 and an appropriate bore 68, 70 in the insertion member 64. The bottom of the insertion member 64 is profiled with a recess 72 and the leading end 74 is profiled for engaging a conductor and drivingly inserting it into a terminal (not shown) of the above mentioned electrical connector 78. The yoke member 52 also has a pin 76 which depends through the bore 62 into the slot 42 of the plate 40.

Figure 2:
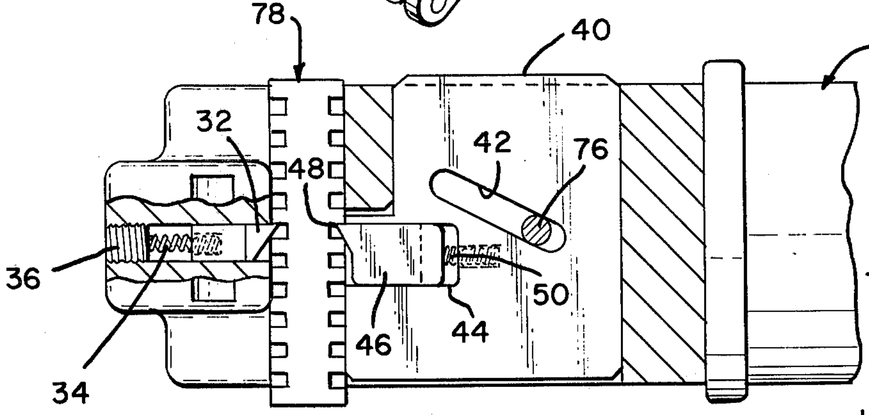
FIG. 2 is an instantaneous section taken along line 2—2 of FIG. 1 with the tool in a first condition prior to a termination cycle.
Figure 3:
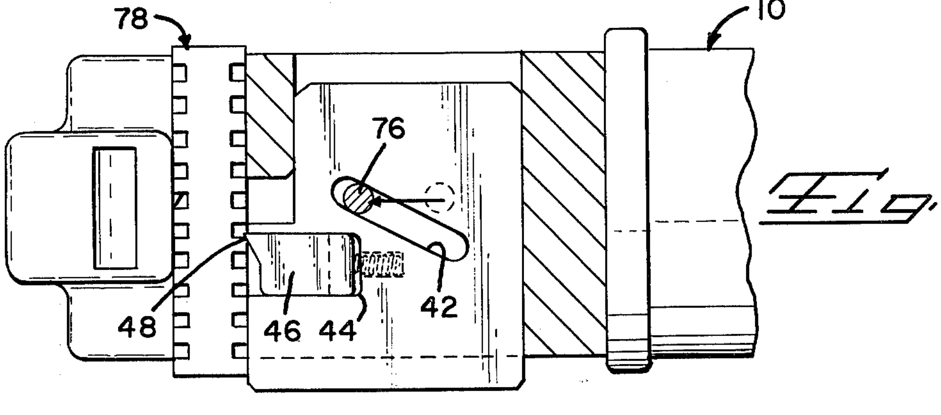
FIG. 3 is an instantaneous section similar to FIG. 2 showing the tool at the end of a termination cycle.

In operation, a connector 78 is inserted into the slot 30, as shown in FIG. 1, and a conductor 80 is inserted into the vertical conductor guide slot 82. The actuation mechanism 14 is squeezed against the hand grip 12 driving the actuation rod 26 forward against the restraining action of the spring 28. This will cause the yoke member 52 to move forwardly so that the leading end 74 of the insertion member 64 engages the conductor 80 and drives it into the waiting terminal (not shown). At the same time the forward movement of the yoke member 52 causes a sideward movement of plate 40 (downward as shown in FIGS. 2 and 3) through the engagement of the pin 76 in bore 62 and slot 42. At the end of the forward motion of the yoke member 52 the tooth 48 of the pawl 46 slides over an intermediate wall in the connector 78 and engages in the next successive slot to drive the connector through the tool (upwards as shown in FIGS. 2 and 3). The pawl 32 secures the connector 78 against return movement.

The illustrated connector 78 is a double row connector and would have to be passed through the tool twice to terminate conductors in each row of terminals. However, the subject tool can also be used for single row connectors (not shown) by placing an insert 84 in the groove 30 to reduce the width sufficiently so that single sided connectors of the type previously described can be terminated. In this instance it would also be necessary to replace the pawl 32 with one having a greater length.

When it is desired to change the tool to accommodate an electrical connector having a different centerline spacing of the terminals, it is only necessary to remove the pin 66 and realign it with the appropriate bores 58, 60 in the yoke member 52 and bores 68, 70 in the insertion member 64. This can readily be seen in FIGS. 4 and 5 showing the different pin engagements.

The present invention may be subject to many modifications and changes without departing from the spirit or essential characteristics thereof. The present embodiment should therefore be considered in all respects as illustrative and not restrictive of the scope of the invention.

What is claimed is:

1. A hand tool for terminating individual conductors sequentially into respective insulation displacing conductor engaging portions of terminals preloaded into a connector housing, said hand tool comprising:

- a frame having a hand grip, an actuation member pivotably mounted in the frame, and a drive shaft actuated by said actuating member;
- a terminating head mounted on said frame and having a transversely extending connector housing passing groove, a pawl assembly extending at least partly into one side of said groove to engage said housing for unidirectional movement thereof, advancement means extending into the opposite side of said groove and engageable with said connector housing to sequentially move it in a forward direction, means interconnecting said advancement means and insertion means including a yoke member one end of which is detachably secured to said drive shaft, first pin means securing said yoke member to said advancement means to coordinate the movements thereof and second pin means connecting conductor stuffing means selectively to said yoke member whereby a variation in the advancement of a connector housing through said tool to accommodate connectors having different centerline spacings of its terminals is accomplished by appropriate placement of said second pin joining said yoke member and said conductor stuffing means.

2. A hand tool according to claim 1 further comprising:

- an insert member received in said connector housing passing groove opposite said stuffing means altering the profile of said groove sufficiently to accommodate connector housings having only a single row of terminals.

3. A hand tool according to claim 1 wherein said advancement means comprises:

- a slot in said head entering said groove from the side of said hand grip,
- a plate slidably mounted in said slot,
- means securing said yoke member and said plate together to produce relative movement therebetween, and
- means on said plate to engage said connector.

4. A hand tool according to claim 3 wherein said means securing said yoke member and said plate together comprises:

- a bore in said yoke member,
- a driving slot in said plate, and
- a pin extending between said bore and said slot whereby linear movement of said yoke member is translated to transverse movement of said plate.

5. A hand tool according to claim 3 wherein said means on said plate to engage said connector comprises:

- a spring biased pawl to move said connector unidirectionally.

6. A hand tool for terminating conductors into an electrical connector of the type having a row of cavities on at least one side and with terminals of the type having an insulation piercing, conductor engaging portion positioned in each of the respective cavities, said tool comprising:

- a pistol grip handle having actuation means mounted therein;
- a frame attached to a front end of the handle and having a transversely-extending, connector-receiving groove, a first slot opening into said groove from the direction of said handle and extending in the direction of said groove, a second slot opening into said groove from the direction of said handle and extending normal to the direction of said first slot, conductor guide slot at the open end of said second slot,
- conductor stuffer means responsive to said actuation means and movable in said second slot for picking a conductor out of said guide means and stuffing it into the conductor engaging portion of a respective terminal; and
- indexing means in said first slot responsive to said actuation means to advance said connector sequentially through said tool; and
- means selectively interconnecting said stuffer means and said indexing means whereby the indexing distance can be varied to accommodate connectors having terminals on different centerline spacings.

7. The hand tool of claim 6 further comprising spring-biased detent means located in the frame on the opposite side of said groove from said indexing means, said detent means restraining said connector for unidirectional movement through the tool.

8. The hand tool of claim 6 wherein said indexing means comprises:

- a yoke member having a slot therein and means to connect said yoke member to said actuation means, said stuffer means being received in said slot;
- plate means in said first slot having means to engage said connector; and means connecting said plate means to said yoke member so that longitudinal movement of said yoke member is translated to transverse movement of said plate means.

9. The hand tool of claim 8 wherein said means on said plate means to engage said connector comprises:

a spring biased pawl allowing unidirectional movement of said connector through said tool.

10. A hand tool for inserting a conductor into a conductor receiving portion of a terminal preloaded into a multi-terminal electrical connector, said connector having at least one row of said terminals, each of said conductor receiving portions having a pair of spaced apart side wall portions with inturned ends which are in alignment with each other defining conductor engaging slots therebetween, said conductor receiving portions of said terminals being outwardly directed from said connector, said apparatus comprising:

frame means, a ram mounted in said frame means, means for moving said ram along a predetermined path from a retracted position in said frame means to an extended position relative to said frame means and for returning said ram to said retracted position, a stuffer member having a leading end portion formed to engage a conductor and insert said conductor into said conductor receiving portion of one of said terminals, said leading end portion to engage said conductor and push said conductor into said slots, means permitting positioning of said wire with its axis extending traversely of said predetermined path, holding means on said frame means for holding said connector proximate to said end of said ram when said ram is in said extended position with said conductor receiving portion of one of said terminals in one of said rows in alignment with said ram, and indexing means responsive to said ram to impart transverse movement of said connector through said holding means, and means connecting said stuffer member and said indexing means in such fashion as to vary the indexing distance.

* * * * *